United States Patent
Jang et al.

(10) Patent No.: US 10,211,952 B2
(45) Date of Patent: Feb. 19, 2019

(54) SCHEME FOR COMMUNICATION USING INTEGER-FORCING SCHEME IN WIRELESS COMMUNICATION SYSTEM

(71) Applicant: Samsung Electronics Co., Ltd., Gyeonggi-do (KR)

(72) Inventors: Min Jang, Seongnam-si (KR); Sung-Ho Chae, Seoul (KR); Cheol Jeong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/593,128

(22) Filed: May 11, 2017

(65) Prior Publication Data

US 2017/0331589 A1 Nov. 16, 2017

(30) Foreign Application Priority Data

May 12, 2016 (KR) .................. 10-2016-0058433

(51) Int. Cl.
*H04L 1/00* (2006.01)
*H04L 25/03* (2006.01)
*H04L 27/34* (2006.01)

(52) U.S. Cl.
CPC .......... *H04L 1/0057* (2013.01); *H04L 1/0041* (2013.01); *H04L 1/0045* (2013.01); *H04L 1/0058* (2013.01); *H04L 25/0391* (2013.01); *H04L 25/03254* (2013.01); *H04L 27/34* (2013.01); *H04L 2025/0342* (2013.01)

(58) Field of Classification Search
USPC .................................. 375/230, 340
See application file for complete search history.

(56) References Cited

U.S. PATENT DOCUMENTS

| | | | | |
|---|---|---|---|---|
| 7,302,018 | B2 * | 11/2007 | Onggosanusi | H04B 1/71055 375/144 |
| 9,118,518 | B2 | 8/2015 | Erez et al. | |
| 2012/0185755 | A1 | 7/2012 | Orlik et al. | |
| 2012/0300828 | A1 * | 11/2012 | Erez | H04L 1/0059 375/230 |
| 2013/0003812 | A1 | 1/2013 | Collotta et al. | |
| 2014/0050275 | A1 | 2/2014 | Kotecha et al. | |
| 2016/0309484 | A1 * | 10/2016 | Hui | H04B 7/0413 |
| 2017/0311331 | A1 * | 10/2017 | Chae | H04B 7/0413 |

OTHER PUBLICATIONS

Zhan et al.,; "Integer-Forcing Linear Receivers"; IEEE Transactions on Information Theory; vol. 60 Issue 12; Dec. 2014; 26 pages.

(Continued)

*Primary Examiner* — Eva Puente

(57) ABSTRACT

A method for receiving a signal by integer forcing in a wireless communication system is provided. The method includes receiving one or more signals through a plurality of antennas, filtering the received one or more signals using a forcing matrix, generating codewords by remapping the filtered one or more signals, acquiring a summed codeword by performing a modulo operation on the codewords, decoding the summed codeword, and acquiring original codewords by performing an inversion operation on the decoded summed codeword.

22 Claims, 17 Drawing Sheets

(56) References Cited

OTHER PUBLICATIONS

Foreign Communication from Related Counterpart Application; PCT Application No. PCT/KR2017/004931; International Search Report dated Jul. 24, 2017; 3 pages.
Foreign Communication from Related Counterpart Application; PCT Application No. PCT/KR2017/004931; Written Opinion of the International Searching Authority dated Jul. 24, 2017; 7 pages.
Wachsmann, U., et al., "Multilevel Codes: Theoretical Concepts and Practical Design Rules," IEEE Transactions on Information Theory, vol. 45, No. 5, Jul. 1999, pp. 1361-1391.
Zahn, J., et al., "Integer-Forcing Linear Receivers," IEEE Transactions on Information Theory, vol. 60, No. 12, Aug. 5, 2014, 26 pages.

* cited by examiner

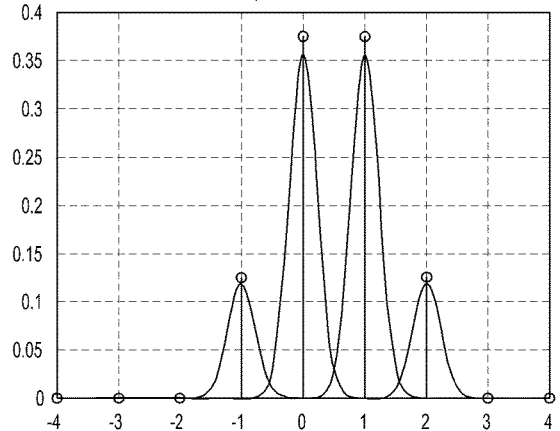

FIG.14

$$[A]_2 \otimes X_0 = (y - z) \bmod 2 = 0 \text{ or } 1$$

$$\Pr([a_i]_2 \otimes x_0 = 0 \mid y_i) = \Pr(y_i \mid [a_i]_2 \otimes x_0 = 0) \times \Pr([a_i]_2 \otimes x_0 = 0)$$
$$= 0.5 \Pr((y_i - z_i) \bmod 2 = 0) = 0.5 \sum_\ell \Pr((y_i - z_i) = 2\ell)$$

$$\Pr([a_i]_2 \otimes x_0 = 0 \mid y_i) = 0.5 \sum_\ell \Pr((y_i - z_i) = 2\ell + 1)$$

$$L_i = \log \frac{\sum_\ell \Pr((y_i - z_i) = 2\ell)}{\sum_\ell \Pr((y_i - z_i) = 2\ell + 1)} \approx \frac{1}{2\sigma_i^2} \left\{ \min_\ell (y_i - (2\ell+1))^2 - \min_\ell (y_i - 2\ell)^2 \right\}$$

FIG.15

PER-LEVEL INDEPENDENT CODING

SCHEME FOR COMMUNICATION USING INTEGER-FORCING SCHEME IN WIRELESS COMMUNICATION SYSTEM

CROSS-REFERENCE TO RELATED APPLICATION(S) AND CLAIM OF PRIORITY

This application claims the benefit under 35 U.S.C. § 119(a) of a Korean patent application filed in the Korean Intellectual Property Office on May 12, 2016 and assigned Serial No. 10-2016-0058433, the entire disclosure of which is incorporated herein by reference.

TECHNICAL FIELD

The present disclosure relates to a communication method, and more particularly, to encoding and decoding methods of a transmitter and a receiver, for applying integer forcing in a wireless communication system.

BACKGROUND

To satisfy the growing demands for wireless data traffic since commercialization of a $4^{th}$ generation (4G) communication system, efforts have been made to develop an improved $5^{th}$ generation (5G) or pre-5G communication system. That is why the 5G or pre-5G communication system is called a beyond 4G network communication system or a post long term evolution (post LTE) system.

To achieve high data rates, deployment of the 5G communication system in a millimeter wave (mmWave) band (for example, 60 GHz) is under consideration. In order to mitigate propagation path loss and increase a propagation distance in the mmWave band, beamforming, massive multiple input multiple output (massive MIMO), full dimensional MIMO (FD-MIMO), array antenna, analog beamforming, and large-scale antenna technologies have been discussed for the 5G communication system.

Further, to improve a system network, techniques such as evolved small cell, advanced small cell, cloud radio access network (cloud RAN), ultra-dense network, device-to-device (D2D) communication, wireless backhaul, moving network, cooperative communication, coordinated multi-point (CoMP), and interference cancellation have been developed for the 5G communication system.

Besides, advanced coding modulation (ACM) techniques such as hybrid FSK and QAM modulation (FQAM) and sliding window superposition coding (SWSC), and advanced access techniques such as filter bank multi carrier (FBMC) and non-orthogonal multiple access (NOMA), and sparse code multiple access (SCMA) have been developed for the 5G communication system.

To cancel interference between symbols transmitted by a transmitter, a receiver adopts a linear equalizer using a linear scheme in a wireless communication system.

Meanwhile, integer forcing (IF) was proposed, which has a similar complexity to those of linear schemes and offers performance close to a maximum likelihood (ML) scheme with optimum performance as a non-linear scheme.

An advantage of IF lies in that IF does not cause noise amplification which is a problem encountered with conventional linear reception schemes, because the sum of codewords transmitted through each transmission antenna of a transmitter (that is, summed codeword) is decoded directly at each reception antenna of a receiver.

For IF implementation, however, the condition that a summed codeword should also be a codeword should be satisfied. As far as a code (or encoding scheme) of the transmitter is still used, it is difficult to satisfy the condition. Accordingly, there is a need for a new encoding (or coding) scheme.

The above information is presented as background information only to assist with an understanding of the present disclosure. No determination has been made, and no assertion is made, as to whether any of the above might be applicable as prior art with regard to the present disclosure.

SUMMARY

An aspect of the present disclosure is to address at least the above-mentioned problems and/or disadvantages and to provide at least the advantages described below. Accordingly, an aspect of the present disclosure is to provide a code designing method for implementing integer forcing (IF) in a real channel environment.

Another aspect of the present disclosure is to provide a method for calculating a log likelihood ratio (LLR) of a summed symbol based on an expanded constellation in order to detect the summed symbol, and a method for obtaining LLRs of individual symbols based on the calculated LLR of the summed symbol.

Another aspect of the present disclosure is to provide, as a scheme for expanding a modulation order, a multi-level coding-based scheme, a conventional bit-interleaved coded modulation-based scheme, and a non-binary code-based scheme, and an encoder operation, modulation, and a decoder operation for each scheme.

Another aspect of the present disclosure is to provide a code modulation scheme for a transmitter, and a decoding procedure for a receiver, for IF.

In accordance with an aspect of the present disclosure, a method for receiving a signal by integer forcing in a wireless communication system is provided. The method includes receiving one or more signals through a plurality of antennas, filtering the received one or more signals using a forcing matrix, generating codewords by remapping the filtered one or more signals, acquiring a summed codeword by performing a modulo operation on the codewords, decoding the summed codeword, and acquiring original codewords by performing an inversion operation on the decoded summed codeword.

In accordance with another aspect of the present disclosure, a method for transmitting information bits in a wireless communication system is provided. The method includes independently encoding sets of bits obtained by dividing information bits by a plurality of levels, modulation-mapping the encoded bits, and transmitting the modulation-mapped bits through a plurality of antennas. A code rate for each of the plurality of levels is adjusted based on a target spectral efficiency.

In accordance with another aspect of the present disclosure, an apparatus for receiving a signal by integer forcing in a wireless communication system is provided. The apparatus includes a transceiver for receiving one or more signals through a plurality of antennas, and a controller for filtering the received one or more signals using a forcing matrix, generating codewords by remapping the filtered one or more signals, acquiring a summed codeword by performing a modulo operation on the codewords, decoding the summed codeword, and acquiring original codewords by performing an inversion operation on the decoded summed codeword.

In accordance with another aspect of the present disclosure, an apparatus for transmitting information bits in a wireless communication system is provided. The apparatus includes a controller for independently encoding sets of bits obtained by dividing information bits by a plurality of levels, and modulation-mapping the encoded bits, and a transceiver for transmitting the modulation-mapped bits through a plurality of antennas. A code rate for each of the plurality of levels is adjusted based on a target spectral efficiency.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments of the present disclosure will be more apparent from the following description taken in conjunction with the accompanying drawings, in which:

FIG. 14 is a view illustrating exemplary calculation of a log likelihood ratio (LLR) for reception antenna m during decoding of the sum of codewords at each antenna;

FIG. 15 is a view illustrating an exemplary detailed method for calculating an LLR during decoding of the sum of codewords;

Throughout the drawings, like reference numerals will be understood to refer to like parts, components, and structures.

DETAILED DESCRIPTION

Figure 1:
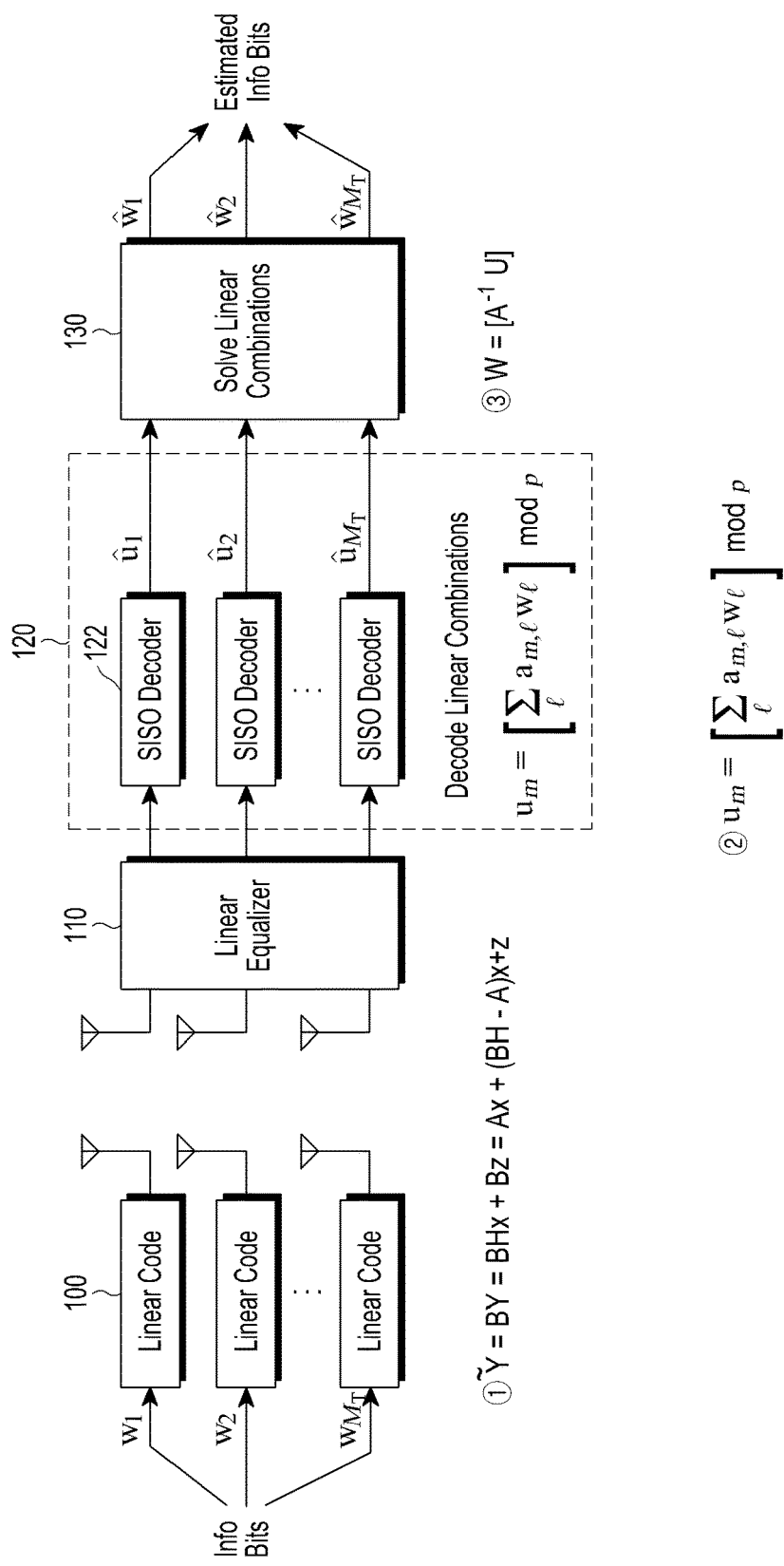
FIG. 1 is a block diagram illustrating exemplary structures of a transmitter and a receiver to which integer forcing (IF) is applied.

FIGS. 1 through 25, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. A detailed description of a generally known function or structure of the present disclosure will be avoided lest it should obscure the subject matter of the present disclosure. Although terms as described below are defined in consideration of functions in the present disclosure, the terms may be changed according to the intention of a user or an operator, or customs. Therefore, the present disclosure should be understood, not simply by the actual terms used but by the meanings of each term lying within.

Before a detailed description of the present disclosure, exemplary meanings as which some terms used in the present disclosure are interpretable will be given below. However, it should be understood that the terms are not limited to the following interpretation examples.

A transmitter is an entity that transmits information bits in a wireless communication system. In the present disclosure, the transmitter refers particularly to a device that performs an encoding operation. For example, the transmitter may be a base station (BS) or a user equipment (UE).

A receiver is an entity that receives information bits in the wireless communication system. In the present disclosure, the receiver refers particularly to a device that performs a decoding operation. For example, the receiver may be a UE or a BS.

A BS is an entity that communicates with a UE. The BS may also be referred to as Node B (NB), evolved Node B (eNB or eNode B), access point (AP), and so on.

A UE is an entity that communicates with a BS. The UE may also be referred to as mobile station (MS), mobile equipment (ME), device, terminal, and so on.

Along with the rapid increase of data traffic in a wireless communication system, active research has been made to increase frequency efficiency and transmission rates. Among developed techniques, multiple input multiple output (MIMO) is a transmission scheme in which a plurality of data streams may be transmitted at the same time through a plurality of transmission (Tx) and reception (Rx) antennas. MIMO offers the benefit of increasing a transmission rate in proportion to the number of antennas.

MIMO transmission and reception schemes are classified into linear schemes such as zero forcing (ZF) and minimum mean square error (MME), and non-linear schemes such as maximum likelihood (ML) and sphere decoding.

Despite the advantage of good performance, the non-linear MIMO schemes suffer from high complexity. Particularly, the non-linear MIMO schemes may increase decoding complexity in proportion to the number of antennas. On the other hand, although the linear MIMO schemes are not relatively high in complexity, they perform poorly compared to the non-linear MIMO schemes.

To overcome the shortcomings of the above-described conventional schemes, integer forcing (IF) has recently been proposed, which is close to the conventional linear schemes in terms of complexity and close to the ML scheme offering the best performance in terms of performance.

FIG. 1 is a block diagram illustrating exemplary structures of a transmitter and a receiver to which IF is applied.

IF is a scheme in which the receiver decodes the sum of codewords without channel inversion as indicated by reference numeral 120, relying on the property that the modulo-sum of linear codes 100 becomes another code. Therefore, noise amplification that the conventional linear schemes suffer from during demultiplexing of multiple data streams may be avoided.

Noise amplification will be described in detail. A case in which channel coefficients are integer coefficients as described in [Equation 1] and a linear code is used at each antenna is considered.

$$\begin{bmatrix} y_1 \\ y_2 \end{bmatrix} = \begin{bmatrix} 2 & 1 \\ 1 & 1 \end{bmatrix} \begin{bmatrix} x_1 \\ x_2 \end{bmatrix} + \begin{bmatrix} z_1 \\ z_2 \end{bmatrix} \qquad \text{[Equation 1]}$$

In a linear scheme, ZF, each stream may be extracted by multiplying a received signal matrix by a channel inversion matrix, as described in [Equation 2]. Then, the stream may be decoded by a single input single output (SISO) decoder 122.

$$\begin{bmatrix} 1 & -1 \\ -1 & 2 \end{bmatrix} \begin{bmatrix} y_1 \\ y_2 \end{bmatrix} = \begin{bmatrix} x_1 \\ x_2 \end{bmatrix} + \begin{bmatrix} z_1 - z_2 \\ -z_1 + 2z_2 \end{bmatrix} \qquad \text{[Equation 2]}$$

As noted from [Equation 2], however, noise variances caused by $z_1$ and $z_2$ are increased respectively by twice ($=1^2+1^2$) and five times ($=1^2+2^2$) during channel inversion, resulting in signal-to-noise ratio (SNR) losses of 3 dB and 7 dB, compared to parallel SISO. [Equation 2] describes exemplary noise amplification after channel inversion.

In IF, the receiver may directly decode codeword sums $2x_1+x_2$ and $x_1+x_2$ to $\hat{u}_1$ and $\hat{u}_2$, respectively without channel inversion, relying on the property that the sum of codewords is also another codeword. Subsequently, the receiver may calculate a linear equation such as [Equation 3] to decode original data streams $x_1$ and $x_2$, as indicated by reference numeral 130.

$$\begin{bmatrix} 1 & -1 \\ -1 & 2 \end{bmatrix} \begin{bmatrix} \hat{u}_1 \\ \hat{u}_2 \end{bmatrix} = \begin{bmatrix} \hat{x}_1 \\ \hat{x}_2 \end{bmatrix} \qquad \text{[Equation 3]}$$

Herein, the important thing is that the receiver performs channel inversion after decoding. In other words, since the receiver performs channel inversion in a noise-free situation, IF does not cause noise amplification, compared to ZF.

While it is assumed in the above example that channel coefficients are integers, the channel coefficients may be complex values on real channels. If the channel coefficients are complex values, the receiver may first use a forcing matrix B.

Specifically, the receiver may force a channel matrix H to be an integer matrix A. For example, a received signal may be expressed as y'=By=Ax+(BH−A)x+z where (BH−A)x+z is treated as effective noise and A represents the integer matrix.

Subsequently, the receiver may directly decode the sum $u_m$ of original codewords to $\hat{u}_m$, relying on the property of a linear code (that is, the property that the linear sum of codewords is also a codeword).

As a result of the decoding, the receiver may extract the original codewords $w_m$ from the noise-free linear-summed codeword $\hat{u}_m$ (for example, using $W=[A^{-1}U]$).

In Equations ①, ②, and ③ described in FIG. 1, z represents a noise vector, $a_{m,j}$ represents an $(m, 1)^{th}$ element in the integer matrix, W represents a matrix with elements $[w_1, w_2, \ldots, w_{M_T}]$, and U represents a matrix with elements $[u_1, u_2, \ldots, u_{M_T}]$.

The most basic requirement or consideration for applying IF is that the sum of codewords received through each reception antenna should also be a codeword. To satisfy the requirement or consideration, each transmitter should perform linear encoding 100, the bits of each code should be added sequentially, and all summation coefficients should be equal during code transmission.

Figure 2:
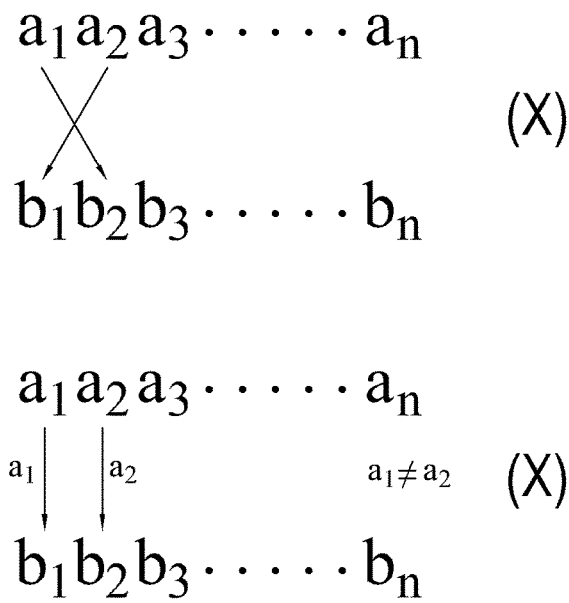
FIG. 2 is a view illustrating exemplary cases in which summation coefficients are not equal during code transmission.

FIG. 2 is a view illustrating an example in which summation coefficients are not equal during code transmission.

However, if a practical code used in current long term evolution (LTE) is applied, the above condition may not be satisfied. For example, in the case of a current bit-interleaved coded modulation (BICM) code, a plurality of bits of a codeword are mapped to one modulated symbol (a mapping rule is different according to a modulation order and a modulation type). Therefore, as the codeword bits experience a channel, they are cross-summed. As a result, a signal received at each Rx antenna is not a codeword itself, thereby making it impossible to decode the signal and thus apply IF. Moreover, Gray labeling available for modulation mapping leads to interleaving of codeword bits, thus not satisfying the condition that codeword bits should be added sequentially.

Accordingly, the present disclosure provides a new practical code designing scheme, for IF implementation.

Specifically, the present disclosure provides a method for calculating the log likelihood ratio (LLR) of a summed symbol in consideration of an expanded constellation in order to detect the summed symbol, and a method for obtaining the LLRs of individual symbols through LLR conversion based on the calculated LLR of the summed symbol.

Further, the present disclosure provides, as a scheme for extending a modulation order, a multi-level coding-based scheme, a BICM-based scheme, and a non-binary code-based scheme, and also provides an encoder operation, modulation mapping, and a decoder operation for each scheme. The proposed schemes are designed in a manner that satisfies the condition that "a summed codeword is also a codeword" by post-processing of a receiver. Therefore, the proposed schemes are designed so that signals received through Rx antennas may be independently decoded in SISO decoders.

In the present disclosure, a description of a method for decoding or detecting a summed codeword/symbol in binary phase shift keying (BPSK) will be followed by a description of expanding BPSK to quadrature amplitude modulation (QAM).

First, a method for decoding or detecting a summed codeword/symbol during BPSK-based IF transmission and reception will be described below.

It is assumed that a transmitter transmits a BPSK symbol through each of Tx antennas and performs independent encoding on an antenna basis, and a rate (that is, a code rate) and a codeword length are equal for the Tx antennas. In addition, each Tx antenna uses a code generated from the same codebook.

Figure 3:
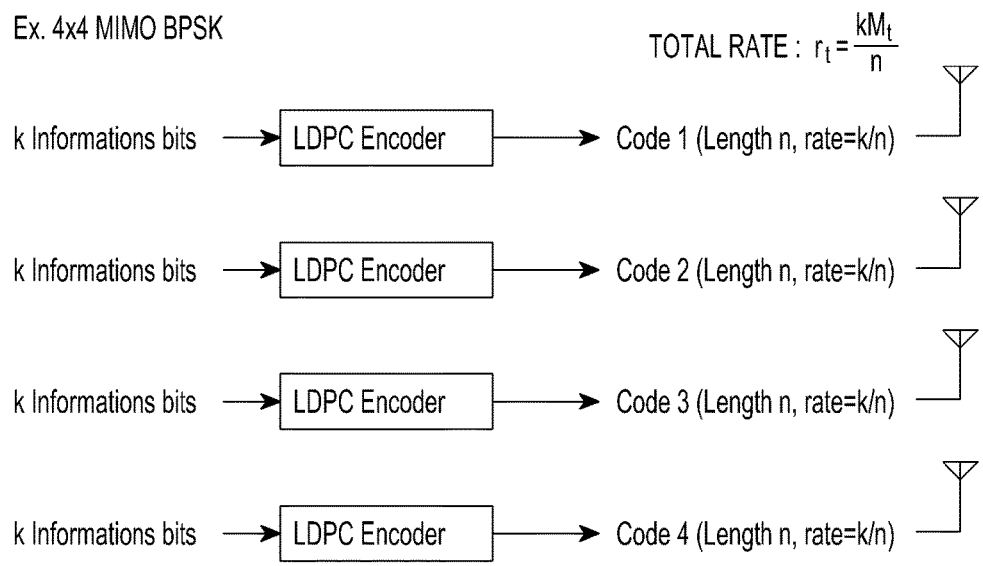
FIG. 3 is a view illustrating a transmission scheme for 4×4 multiple input multiple output (MIMO) binary phase shift keying (BPSK) transmission according to an embodiment of the present disclosure.

FIG. 3 is a view illustrating an exemplary transmission scheme for 4×4 MIMO BPSK transmission according to an embodiment of the present disclosure.

Referring to FIG. 3, a receiver receiving a signal from a transmitter may perform filtering, for IF.

The received signal of the receiver may be expressed as $y(t)=Hx(t)+z(t)$. Herein, the receiver may perform filtering using a forcing matrix B for IF.

After the filtering, the received signal may be given as [Equation 4].

$$\tilde{y}(t)=By(t)=BHx(t)+Bz(t)=Ax(t)+(BH-A)x(t)+Bz(t) \quad \text{[Equation 4]}$$

If an integer matrix A is given, an optimal matrix B may be determined by [Equation 5].

$$B_{opt}=SNR A H^T (I+SNR H H^T)^{-1} \quad \text{[Equation 5]}$$

Herein, an integer matrix A minimizing effective noise $(BH-A)x(t)+Bz(t)$ is searched for, and it is known that the optimal matrix A is not related to the value of the matrix B.

Herein, H represents a channel matrix, z represents noise, t represents a time slot, $A^{-1}$ represents the inverse matrix of A, and $A^T$ represents the transpose matrix of A.

Subsequently, the receiver may perform remapping by the following equation in order to transition from a modulation domain to a coded domain.

$$\bar{y}(t) = \frac{1}{2}(\tilde{y}(t) + 2A\mathbf{1}) = A\begin{bmatrix} b^{(1)}(t) \\ \vdots \\ b^{(M)}(t) \end{bmatrix} + \bar{z}(t) \quad \text{[Equation 6]}$$

where 1 is a vector with all elements being 1s.

Then, the receiver may detect or decode a summed symbol, relying on the property that the modulo-sum of codewords is also a codeword (that is, the linear code property). To detect or decode the summed symbol, the receiver may calculate the LLR of the summed symbol in consideration of an expanded constellation.

Figure 4:
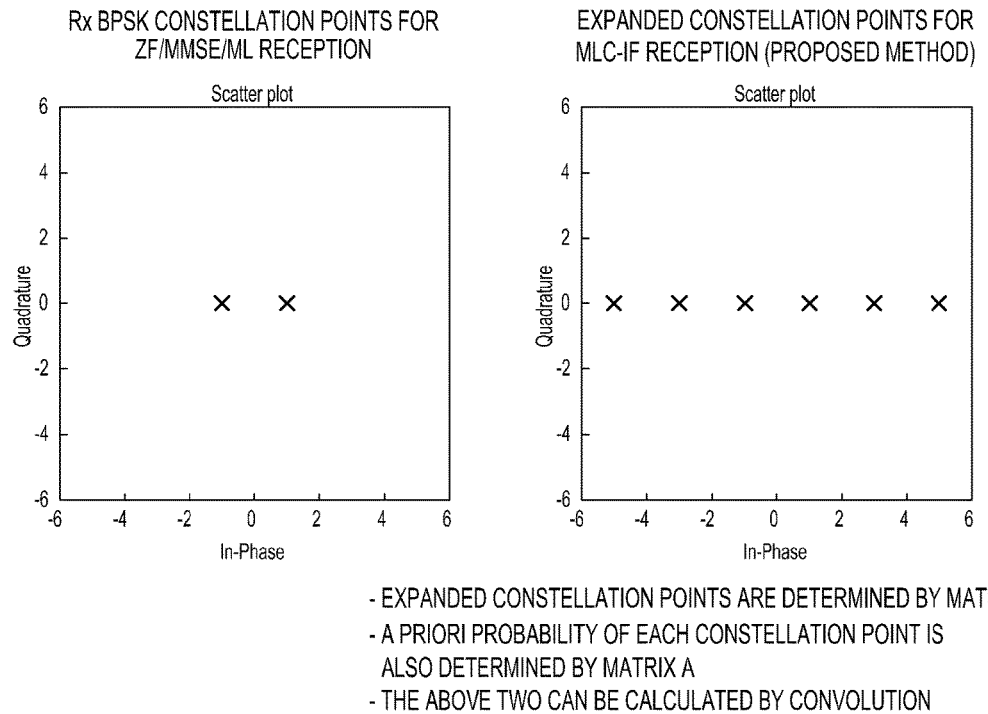
FIG. 4 is a view illustrating expansion of a constellation during detection of a summed symbol according to an embodiment of the present disclosure.

FIG. 4 is a view illustrating constellation expansion during detection of a summed symbol according to an embodiment of the present disclosure. In FIG. 4, the left drawing illustrates exemplary Rx BPSK constellation points for a receiver such as a ZF, MMSE, or ML receiver, and the right drawing illustrates expanded constellation points for a summed symbol. The expanded constellation points may be determined by the integer matrix A, and the a priori probability of each constellation point may also be determined by the integer matrix A. The constellation points and the a priory probabilities may be calculated by convolution.

The LLR of the summed symbol may be calculated by the following equation.

[Equation 7]

$$Pr([a_i]_2 \otimes b^0 = 0 \mid \bar{y}_i) = Pr(\bar{y}_i \mid [a_i]_2 \otimes b^0 = 0)Pr([a_i]_2 \otimes b^0 = 0) =$$

$$\sum_l Pr([a_i]_2 \otimes b^0 = 2l)Pr(\bar{y}_i - \bar{z}_i = 2l) =$$

$$\underbrace{\left[\sum_l Pr([a_i]_2 \otimes b^0 = 2l)\right]}_{(1)} \underbrace{\left\{\frac{1}{\sqrt{2\pi\bar{\sigma}_i^2}}\exp\left(-\frac{1}{2\bar{\sigma}_i^2}(\bar{y}_i - 2l)^2\right)\right\}}_{(2)}$$

$$Pr([a_i]_2 \otimes b^0 = 1 \mid \bar{y}_i) =$$

$$\sum_l Pr([a_i]_2 \otimes b^0 = 2l+1)\frac{1}{\sqrt{2\pi\bar{\sigma}_i^2}}\exp\left(-\frac{1}{2\bar{\sigma}_i^2}(\bar{y}_i - (2l+1))^2\right) \therefore$$

$$\log\frac{Pr([a_i]_2 \otimes b^0 = 0 \mid \bar{y}_i)}{Pr([a_i]_2 \otimes b^0 = 1 \mid \bar{y}_i)} =$$

$$\log\frac{\sum_l Pr([a_i]_2 \otimes b^0 = 2l)\exp\left(-\frac{1}{2\bar{\sigma}_i^2}(\bar{y}_i - 2l)^2\right)}{\sum_l Pr([a_i]_2 \otimes b^0 = 2l+1)\exp\left(-\frac{1}{2\bar{\sigma}_i^2}(\bar{y}_i - (2l+1))^2\right)} \approx$$

$$Pr([a_i]_2 \otimes b^0 = 2l)\frac{1}{2\bar{\sigma}_i^2}\min_l(\bar{y}_i - (2l+1))^2 -$$

$$Pr([a_i]_2 \otimes b^0 = 2l+1)\frac{1}{2\bar{\sigma}_i^2}\min_l(\bar{y}_i - 2l)^2$$

(1) a priori calculation using matrix $A$ (2) A posteriori calculation using ED to summed symbol (ML of expanded constellation point)

Because a summed codeword is also a codeword, the summed codeword may be decoded independently by the LLR calculation method described in [Equation 7].

The receiver may decode original codewords from $\bar{y}^{(1)}$, $\bar{y}^{(2)} \ldots \bar{y}^{(M)}$ by an inversion A operation. If a decoding error occurs, the receiver may announce the error.

Now, a description will be given of methods for extending the method for detecting or decoding a summed symbol/codeword in BPSK to QAM.

As a first method for expanding BPSK to QAM, a multi-level coding (MLC)-based IF scheme is proposed.

Figure 5:
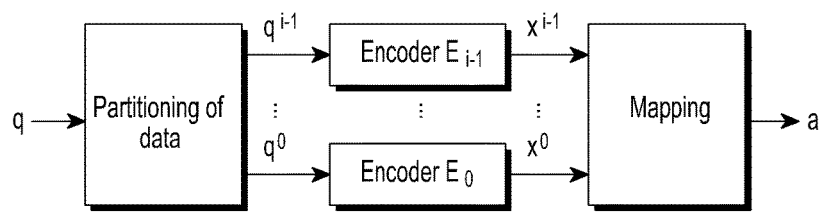
FIG. 5 is a block diagram illustrating an exemplary structure of a multi-level encoder.

FIG. 5 illustrates an exemplary structure of a multi-level encoder.

MLC is an encoding scheme in which a transmitter divides information bits into a plurality of sets on a level basis (for example, in a least significant bit (LSB) to most significant bit (MSB) order) and independently encode the sets of information bits. The transmitter performs Ungerboeck's modulation mapping according to levels, prior to transmission.

Figure 6:
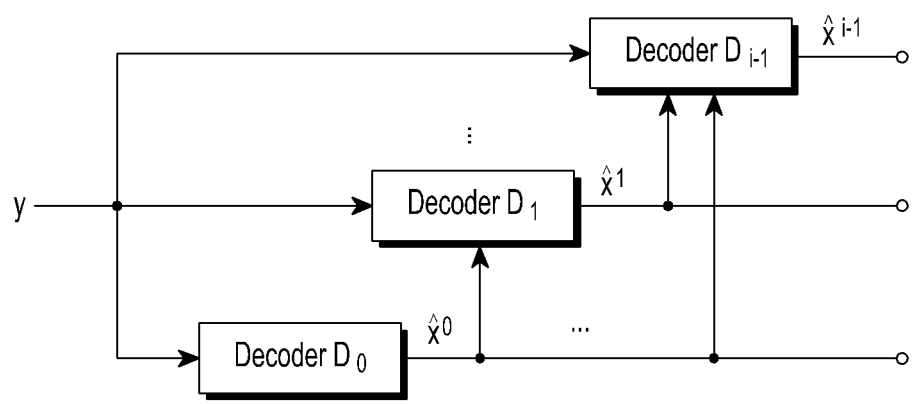
FIG. 6 is a block diagram illustrating an exemplary structure of a multi-stage decoder.

FIG. 6 illustrates an exemplary structure of a multi-stage decoder.

A receiver receiving a signal transmitted through MLC may perform multi-stage decoding. Multi-stage decoding is a scheme in which decoding proceeds from a lower level and then successive interference cancellation (SIC) is performed.

Figure 7:
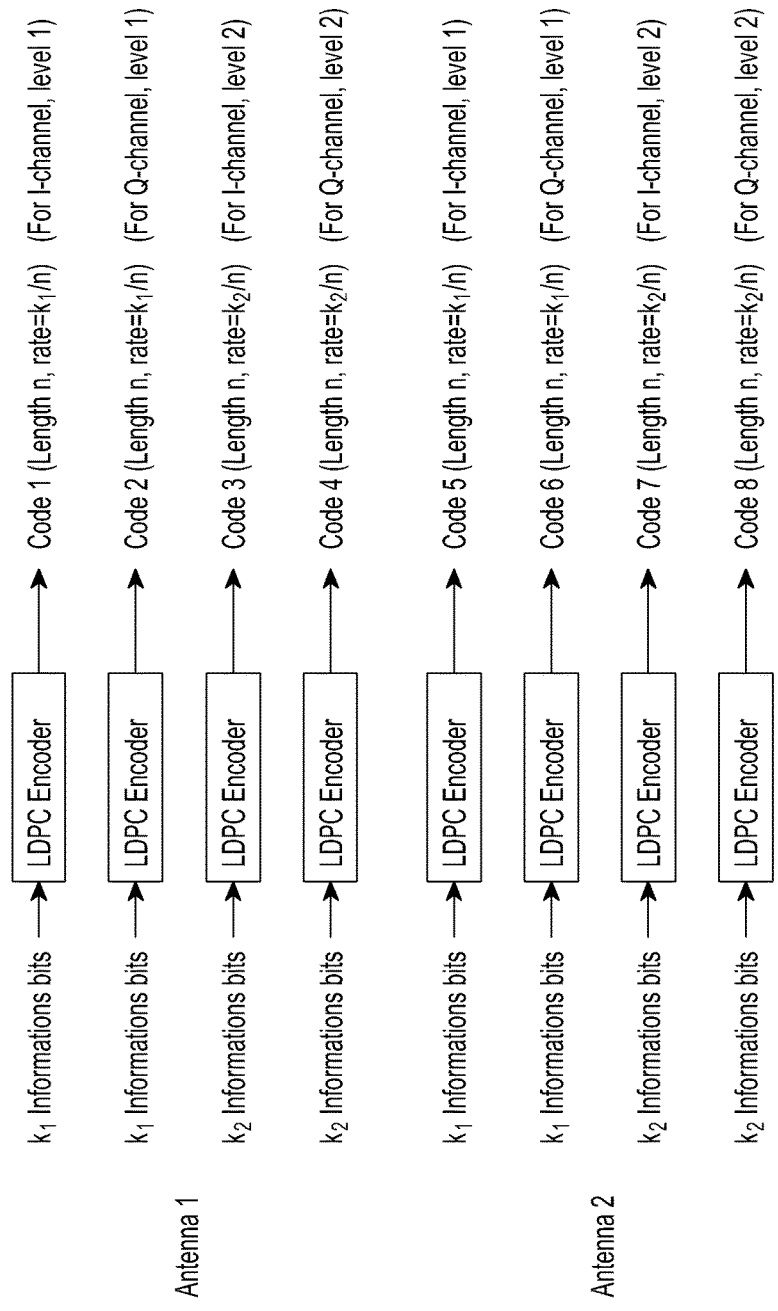
FIG. 7 is a view illustrating a proposed encoding scheme in the case of 2×2 16-ary quadrature amplitude modulation (16QAM) according to an embodiment of the present disclosure.

FIG. 7 is a view illustrating an exemplary proposed encoding scheme for 2×2 16QAM according to an embodiment of the present disclosure.

FIG. 7 will be described on the assumption of two Tx antennas and two levels.

To achieve the best performance of MLC, rate optimization is needed by controlling a code rate on a level basis. During rate control, a code length may be fixed to n in each stage, and rates $k_1/n$ and $k_2/n$ may be controlled by the numbers of information bits in the sets, $k_1$ and $k_2$.

1) An MLC scheme for IF implementation will first be described.

The present disclosure proposes an L-level independent encoding scheme in which in the case of $2^{2L}$-modulation, 2L codewords are encoded independently on an antenna basis, using a linear code (for example, a turbo code or a low density parity check (LDPC) code).

At the same level, in-phase (I) channel and quadrature-phase (Q) channel rates are set to be equal, and a code rate is set to be lower at a lower level than at a higher level. Thus, per-level rate optimization may be achieved.

2) A per-level rate optimization method will be described in greater detail.

As described above, a lower code rate is allocated to a lower level. This is because an effective SNR is lower and thus a capacity is smaller at the lower level, and error propagation from an LSB to an MSB is to be prevented. A rate optimization procedure may be performed by determining a rate for each level based on a target spectral efficiency overall rate (R). The target spectral efficiency R may be expressed as the following equation.

$$R = 2\sum_{i=1}^{L} R_i \quad \text{[Equation 8]}$$

A rate $R_i$ for each level i is determined based on the following criteria.

(A) If the transmitter has no knowledge of a channel size, a rate determined on a level basis may be applied equally to all streams (streams transmitted through a plurality of antennas). To determine a rate for each level, the transmitter may i) calculate a capacity on a level basis by Ungerboeck's labeling and determine a rate on a level basis based on the calculated capacities, ii) set a summed codeword-based target block error rate (BLER) for each level, and determine a rate satisfying the target BLER for the level, or iii) determine a rate for each level in consideration of a Hamming distance and a Euclidean distance (ED) at the level.

(B) If the transmitter has knowledge of a channel size, optimization is possible in consideration of expected linear combinations of streams. Thus, the receiver may expect an integer matrix A to be selected (the receiver may select the integer matrix A based on a channel). As a consequence, rate determination may be optimized.

For example, if the integer matrix $$A = \begin{pmatrix} 1 & 0 & 1 & 0 \\ 0 & 1 & 0 & 1 \\ 0 & 0 & 1 & 1 \\ 1 & 1 & 0 & 1 \end{pmatrix},$$

the SNR of a summed codeword is four times higher than an individual SNR, based on which the transmitter may determine a rate. For this operation, when the receiver feeds back a channel quality indicator (CQI) to the transmitter, the receiver may calculate the sum of the matrix A or the sum of column matrices in the matrix A and transmit the sum to the transmitter, instead of channel feedbacks, in order to reduce feedback overhead and a computation volume.

Figure 8:
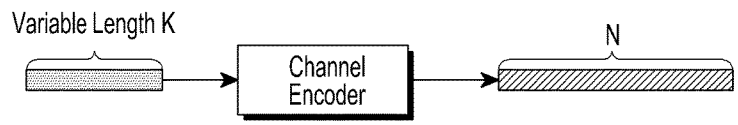
FIG. 8 is a view illustrating an exemplary consideration regarding the length of information bits and a codeword at a transmitter using multi-level coding.

FIG. 8 is a view illustrating an exemplary consideration regarding the length of information bits and a codeword at a transmitter using MLC.

Herein, a method for supporting MLC with a single channel code structure is considered, and rate compatibility and a fixed length of codeword are used or required. A channel encoding scheme for MLC-IF may be adapted more specifically according to an encoding type.

Figure 9:
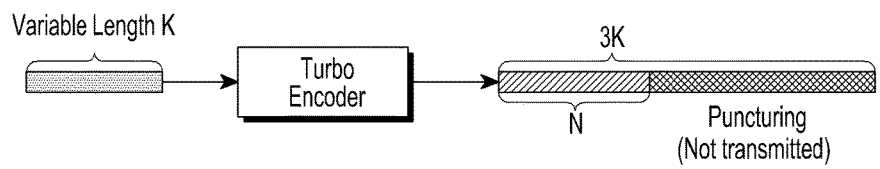
FIG. 9 is a view illustrating an exemplary consideration for multi-level coding in the case of turbo coding.

FIG. 9 is a view illustrating an exemplary consideration for MLC in the case of turbo coding.

In the case of a turbo code, the turbo code may be designed in a manner that achieves the following characteristics. First, a channel coding scheme for the turbo code is still applied. Secondly, all of a modulation and coding scheme (MCS) table and rate combinations are newly defined.

Figure 10:
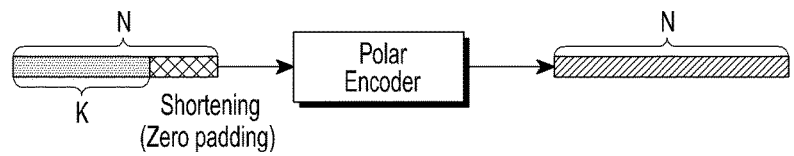
FIG. 10 is a view illustrating an exemplary consideration for multi-level coding in the case of polar coding.

FIG. 10 is a view illustrating an exemplary consideration for MLC in the case of polar coding.

A polar code is applied based on the assumption that $N=2^n$. If $N \neq 2^n$, puncturing is required or used. In the case of a polar code, the polar code may be made in a manner that achieves the following characteristics. First, a channel coding scheme itself may be newly standardized. Secondly, a method for determining N and K may also be newly standardized for MLC-IF. Thirdly, transport block size (TBS) and rate combinations should be determined.

Figure 11:
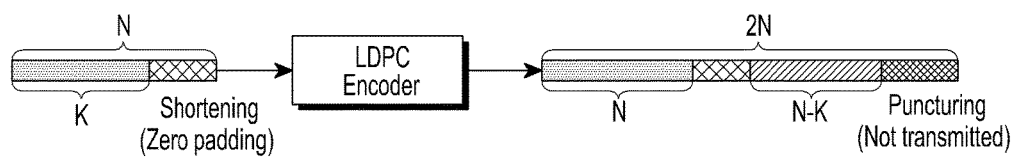
FIG. 11 is a view illustrating an exemplary consideration for multi-level coding in the case of low density parity check (LDPC) coding.

FIG. 11 is a view illustrating an exemplary consideration for MLC in the case of LDPC coding.

For an LDPC code, a single structure mother code with length 2N and rate ½ is used. In the case of an LDPC code, the LDPC code may be designed in a manner that achieves the following characteristics. First, information bits may be shorted by N-K bits before encoding. Secondly, a codeword of 2N bits is generated after encoding. Thirdly, K parity bits may be punctured.

3) A modulation mapping method for IF will be described.

For modulation mapping, the transmitter may map bits to I and Q channels independently by Ungerboeck's mapping according to the following equation.

$$b^{(m)}_1(t), b^{(m)}_2(t), \ldots, b^{(m)}_{2L}(t) \text{ (bits transmitted through antenna } m \text{ at time } t) \rightarrow x^{(m)}_c(t) =$$
$$\Sigma_{i=1}^{L} 2^i b^{(m)}_{2i-1}(t) - (L+1) + j(\Sigma_{i=1}^{L} 2^i b^{(m)}_{2i}(t) - (L+1))$$
(mapping) [Equation 9]

Figure 12:
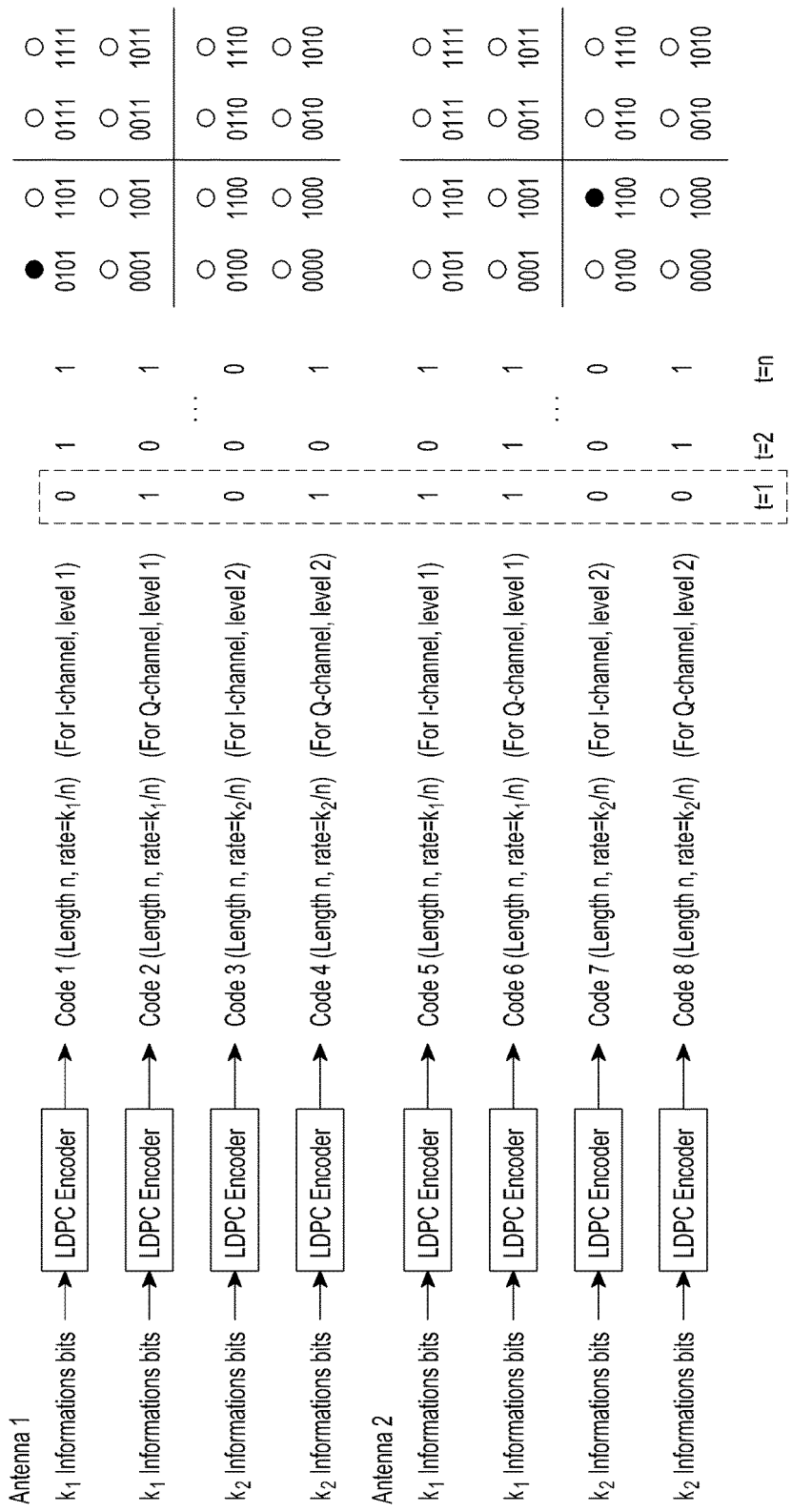
FIG. 12 is a view illustrating an exemplary proposed modulation mapping scheme in 2×2 16QAM.

FIG. 12 is a view illustrating an exemplary proposed modulation mapping scheme for 2×2 16QAM.

4) A receiver operation will be described below.

If a received signal is given as y(t)=Hx(t)+z(t), as described before, an optimal matrix B for a given matrix A may be determined by [Equation 5]. In addition, a received signal after applying a receiver filer B at the receiver is determined by [Equation 4]. In [Equation 4] and [Equation 5], a matrix A that minimizes effective noise (BH−A)x(t)+Bz(t) may be searched for.

5) A remapping procedure of the receiver will be described.

Remapping is a process of returning a received signal from the modulation domain to the coded domain.

If the received signal is expressed as follows after A and B are determined, $$\tilde{y}(t) = By(t) = BHx(t) + Bz(t) = Ax(t) + (BH-A)x(t) + Bz(t) = Ax(t) + \tilde{z}(t)$$ [Equation 10]

the remapping may be performed by constant term shifting and scaling according to the following equation.

$$\tilde{y}(t) = 1/2(\tilde{y}(t) + A(L+1)\mathbf{1}) = A \begin{bmatrix} \sum_{i=1}^{L} 2^{i-1} b^{(1)}_{2i-1}(t) \\ \vdots \\ \sum_{i=1}^{L} 2^{i-1} b^{(M)}_{2i-1}(t) \\ \sum_{i=1}^{L} 2^{i-1} b^{(1)}_{2i}(t) \\ \vdots \\ \sum_{i=1}^{L} 2^{i-1} b^{(M)}_{2i}(t) \end{bmatrix} + \tilde{z}(t)$$ [Equation 11]

where 1 represents a vector with all elements being 1s (that is, an all-one vector). Subsequently, the receiver eliminates the remaining codeword bits except for codeword bits at level 1 by a modulo-2 operation according to the following equation.

$$\bar{y}(t) \bmod 2 = \left( A \begin{bmatrix} b^{(1)}_1(t) \\ \vdots \\ b^{(M)}_1(t) \\ b^{(1)}_2(t) \\ \vdots \\ b^{(M)}_2(t) \end{bmatrix} + \tilde{z}(t) \right) \bmod 2 \Rightarrow \begin{bmatrix} \bar{y}^{(1)}_{1,re}(t) \\ \vdots \\ \bar{y}^{(M)}_{1,re}(t) \\ \bar{y}^{(1)}_{1,imag}(t) \\ \vdots \\ \bar{y}^{(M)}_{1,imag}(t) \end{bmatrix} = \left( A \begin{bmatrix} b^{(1)}_1(t) \\ \vdots \\ b^{(M)}_1(t) \\ b^{(1)}_2(t) \\ \vdots \\ b^{(M)}_2(t) \end{bmatrix} \right)$$

One thing to note herein is that $\bar{y}^{(i)}_{1,re}(1), \bar{y}^{(i)}_{1,re}(2), \ldots \bar{y}^{(i)}_{1,re}(n)$ is a codeword $\forall i=1, 2, \ldots M$ $\bar{y}^{(i)}_{1,imag}(1), \bar{y}^{(i)}_{1,imag}(2), \ldots \bar{y}^{(i)}_{1,imag}(n)$ is a codeword $\forall i=1, 2, \ldots M$ are all decodable codewords because of the condition that a summed codeword of a linear code is also a codeword.

6) Level-1 codeword decoding at the receiver will be described.

As described before, the receiver may perform decoding independently, relying on the property that $\bar{y}^{(i)}_{1,re}(1), \bar{y}^{(i)}_{1,re}(2), \ldots \bar{y}^{(i)}_{1,re}(n)$ is a codeword $\forall i=1, 2, \ldots M$ $\bar{y}^{(i)}_{1,imag}(1), \bar{y}^{(i)}_{1,imag}(2), \ldots \bar{y}^{(i)}_{1,imag}(n)$ is a codeword $\forall i=1, 2, \ldots M$. Subsequently, the receiver may complete level-1 decoding 1 by extracting original codewords from a summed codeword through an inversion A operation. If a decoding error occurs during the level-1 decoding, the receiver announces the error and does not perform decoding for the next level. On the other hand, if a decoding error does not occur, the receiver may start a process for a codeword at the next level.

7) SIC, rescaling, and a modulo-operation of the receiver will be described.

After components related to the level-1 codewords are eliminated from the received signal based on the decoded level-1 codewords (that is, SIC), the following equation may be obtained by performing a ½ operation and a modulo-2 operation on the resulting signal.

$$(0.5(\bar{y}(t) - A\hat{x}_{b0}(t))) \bmod 2 = \left( A \begin{bmatrix} b^{(1)}_3(t) \\ \vdots \\ b^{(M)}_3(t) \\ b^{(1)}_4(t) \\ \vdots \\ b^{(M)}_4(t) \end{bmatrix} + \tilde{z}(t) \right) \bmod 2$$ [Equation 13]

The subsequent operations are performed in the same manner as in the level-1 operation. After level-2 decoding, SIC may be performed (that is level-2 related components are eliminated from the received signal). This recursive operation may be repeated until level L.

Figure 13:
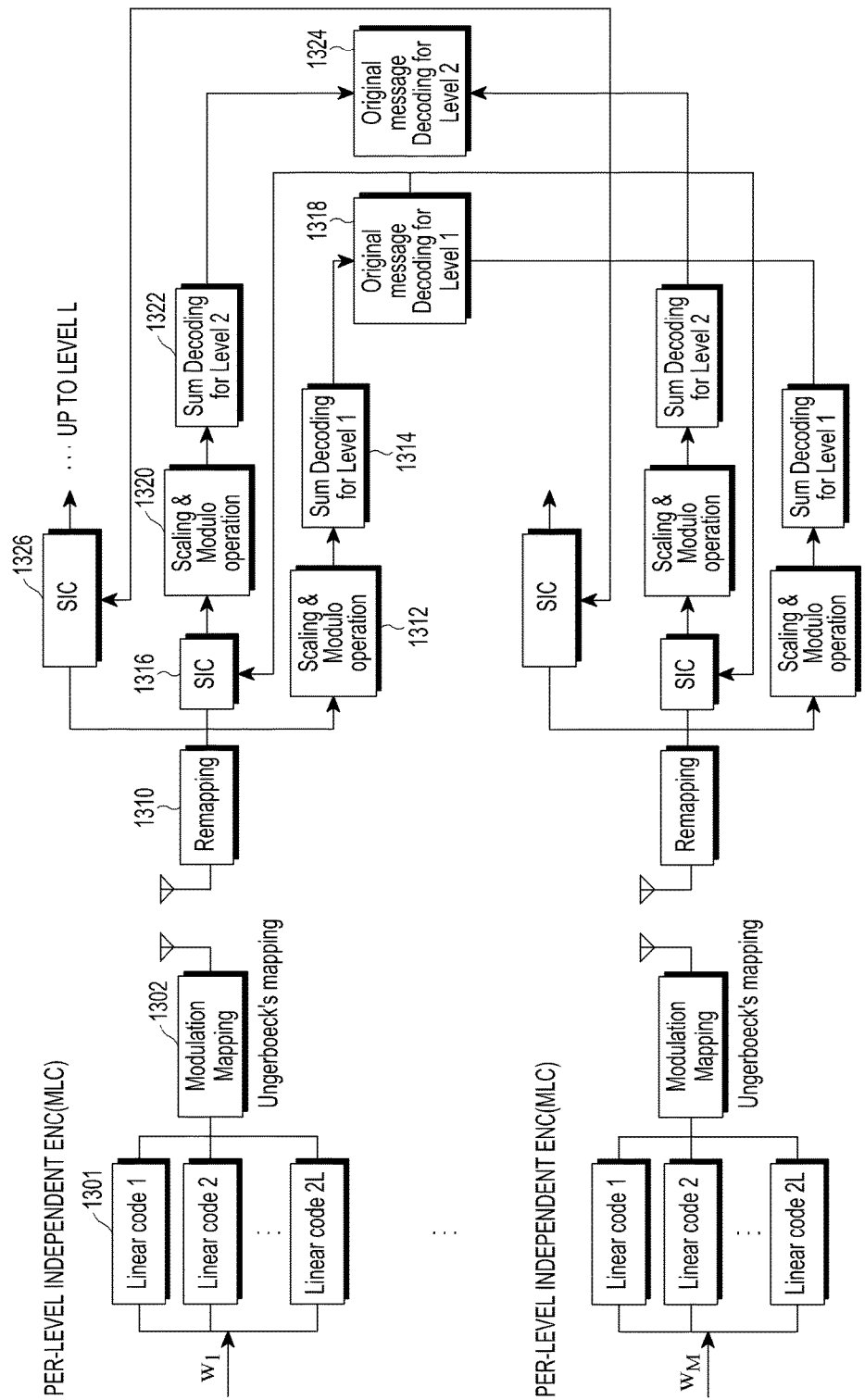
FIG. 13 is a view describing a proposed multi-level coding (MLC)-based integer forcing (IF) scheme by operations of a transmitter and a receiver according to an embodiment of the present disclosure.

FIG. 13 is a view illustrating a proposed MLC-based IF scheme by operations of a transmitter and a receiver according to an embodiment of the present disclosure.

In FIG. 13, it is assumed that each of the transmitter and the receiver uses M antennas. The transmitter may perform independent decoding on a level basis, using linear codes 1301. The codewords resulting from the per-level independent encoding may be mapped by, for example, Ungerboeck's modulation mapping 1302 and then transmitted.

Upon receipt of a signal from the transmitter, the receiver may perform remapping 1310 by which the received signal is converted from the modulation domain to the coded domain. The receiver may eliminate the remaining codeword bits except for codeword bits corresponding to level 1 by performing a modulo-operation 1312 on codeword bits obtained by the remapping. The receiver may perform decoding 1314 on the sum of level-1 codewords. The receiver may extract the original codewords of level 1 by performing an inversion A operation on the decoded sum of codewords, as indicated by reference numeral 1318. The receiver may perform SIC 1316 by which the components of level 1 are eliminated from the codeword bits resulting from the remapping 1310. Subsequently, the receiver may perform processes 1320, 1322, 1324, and 1326 for level 2 on the codeword bits from which the components of level 1 have been eliminated. These processes may be repeated until level L.

Figure 16:
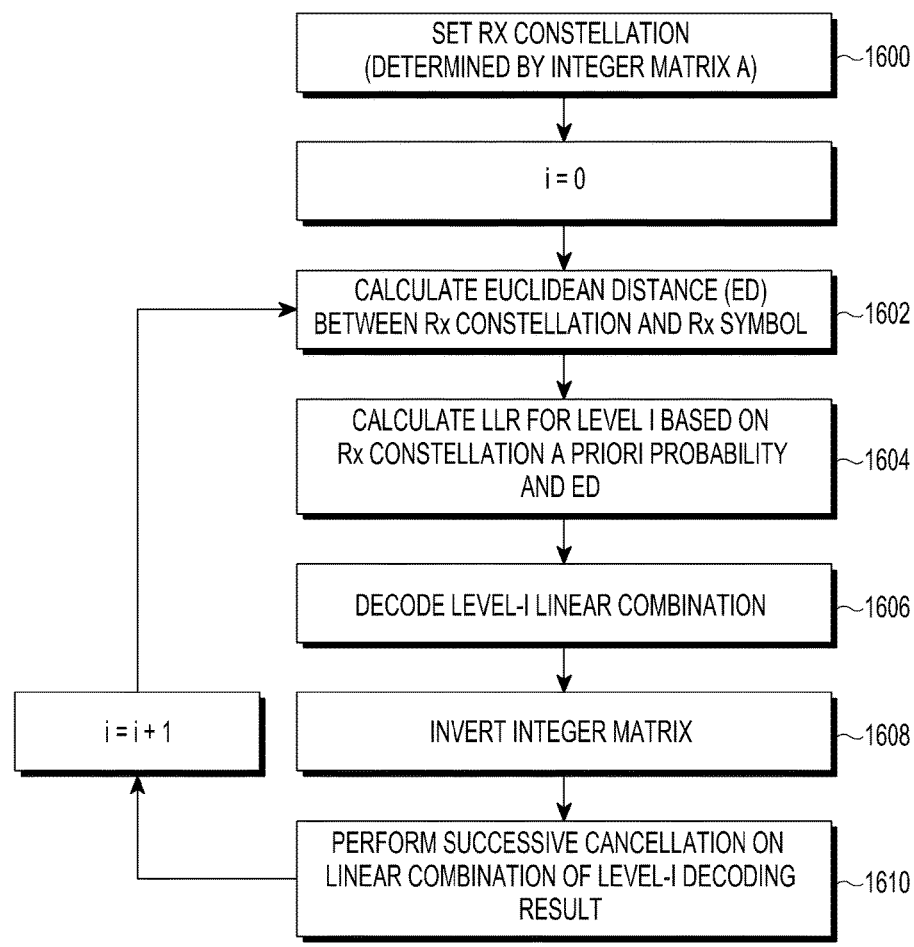
FIG. 16 is a view comparing a general MIMO detection and decoding method with a MIMO detection and decoding method to which IF is applied.

FIG. 14 is a view illustrating exemplary calculation of an LLR for Rx antenna m during decoding of a summed codeword for each antenna, FIG. 15 is a view illustrating a detailed method for calculating an LLR during decoding of a coded sum, and FIG. 16 is a flowchart illustrating a method for IF-based MIMO detection and decoding.

An IF application example of FIG. 16 will be described in detail. The receiver may determine an Rx constellation which may be determined according to an integer matrix A in operation 1600.

The receiver may calculate an ED between the Rx constellation and an Rx symbol in operation 1602.

The receiver may calculate an LLR for level i using the a priori probability and ED of the Rx constellation in operation 1604.

The receiver may decode a linear combination (that is, the sum of codewords encoded using a linear code) for level i in operation 1606.

The receiver may obtain original codewords for level i by performing an inversion A operation on the decoded linear combination in operation 1608.

The receiver may perform SIC by which to eliminate the original codewords of level i from the linear combination in operation 1610.

The receiver may additionally perform operations 1602 to 1610 for the next level.

Figure 17:
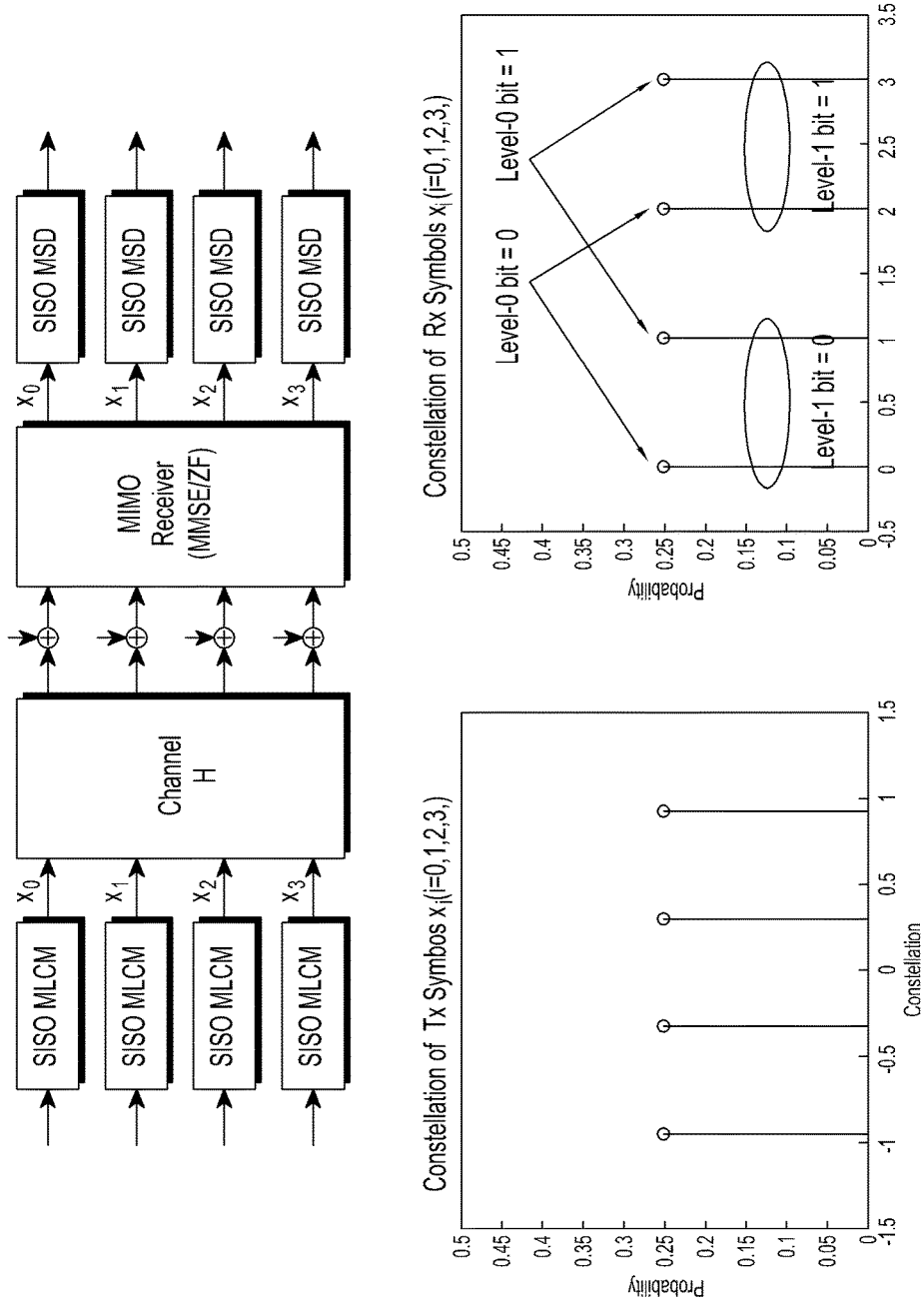
FIG. 17 is an exemplary view illustrating a symbol detection scheme and a reception symbol constellation in a linear scheme.
Figure 18:
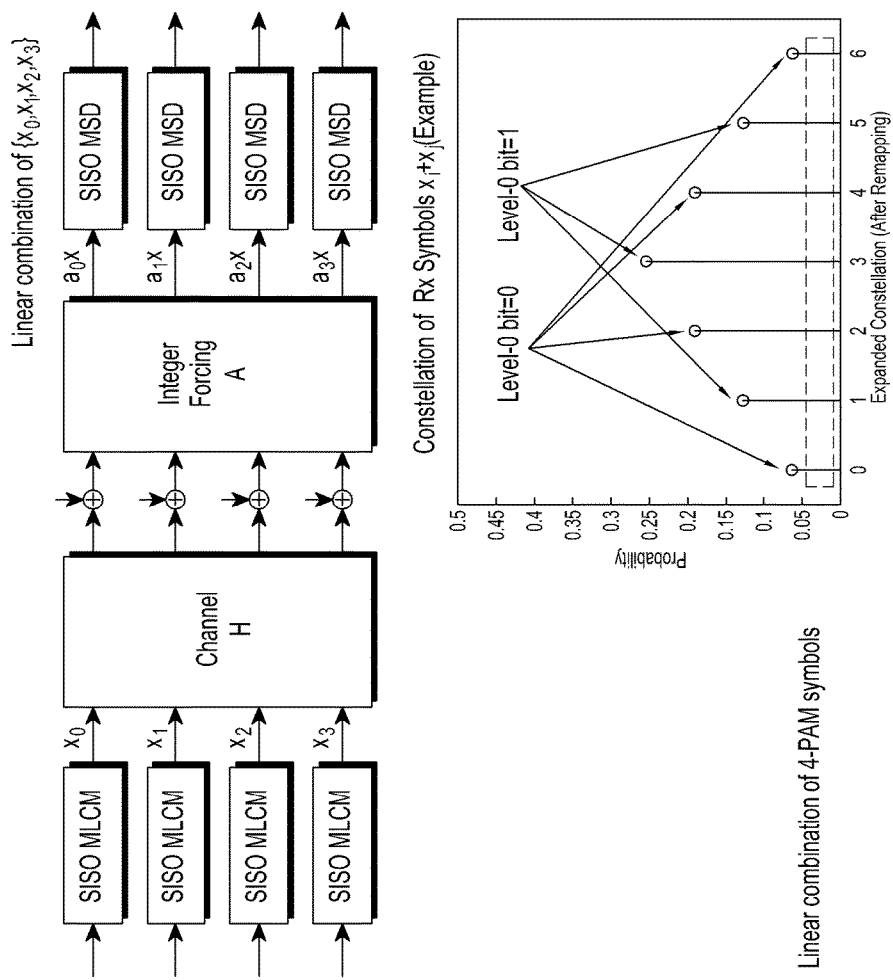
FIG. 18 is an exemplary view illustrating a symbol detection scheme and a reception symbol constellation in an MLC-IF scheme.
Figure 19:
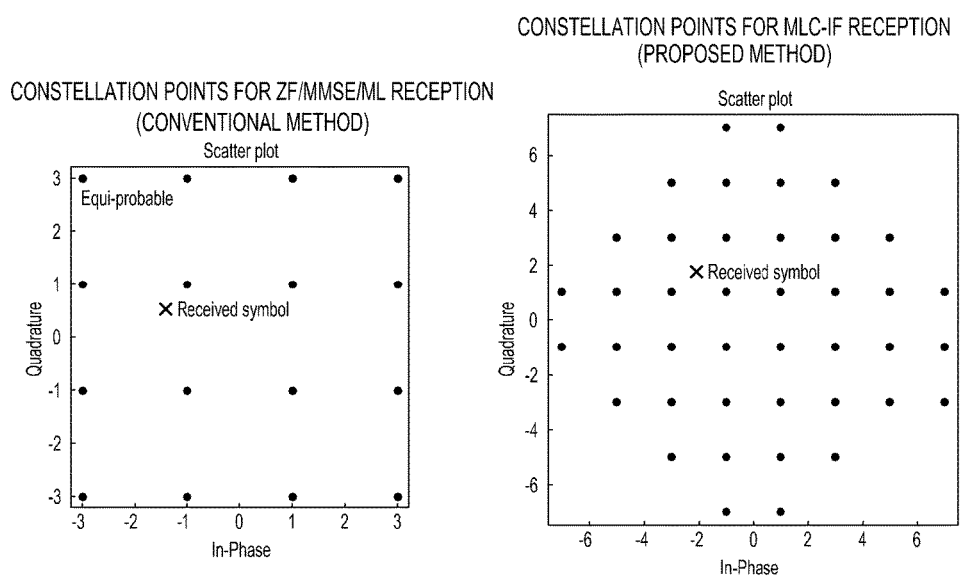
FIG. 19 is a view illustrating an exemplary situation in which a constellation is expanded in the MLC-IF scheme.

FIG. 17 is an exemplary view illustrating a symbol detection scheme and an Rx symbol constellation in a linear scheme, FIG. 18 is an exemplary view illustrating a symbol detection scheme and an Rx symbol constellation in an MLC-IF scheme, and FIG. 19 is a view illustrating constellation expansion in the MLC-IF scheme.

In the MLC-IF scheme, an encoder change of a transmitter for MLC may be reflected. When needed, a hardware change as well as a software change may be reflected. Specifically, compared to BICM, the number of channel encoder blocks may increase, a modulation mapping rule may be changed, and a codeword length may be decrease. Per-level/per-stream rate optimization may be performed adaptively according to a channel or using a predetermined look-up table made in consideration of effective SNR differences among levels.

In the MLC-IF scheme, a remapping calculator for MLC may be added to the receiver. A buffer, a calculator, and so on for performing SIC during multi-stage decoding may also be added. A calculator for searching for a matrix A according to general IF-related characteristics, a calculator for detecting original codewords based on a summed codeword (through an inversion A operation), and the like may be added. Also, an LLR calculator for detecting a summed codeword may be added.

As another method for expanding BPSK to QAM, a method for designing a code to apply IF when BICM adopted in current LTE is used will be described below.

In this scheme, the receiver may first detect the sum of symbols, and secondly perform symbol-level SIC. For the convenience of description, the scheme is based on the assumption that the transmitter uses Ungerboeck's mapping. However, even though Gray mapping is used, the receiver may transform Gray mapping to Ungerboeck's mapping by additional post-processing. Gray mapping and Ungerboeck's mapping are placed in the relationship described in the following equation.

[Equation 14]

Ungerboeck's mapping→Gray mapping  (1)

$a_3 a_2 a_1 \rightarrow g_3 g_2 g_1$ $g_3 = a_3,\ g_2 = a_3 \oplus a_2,\ g_1 = a_2 \oplus a_1$ Gray mapping→Ungerboeck's mapping  (2)

Figure 20:
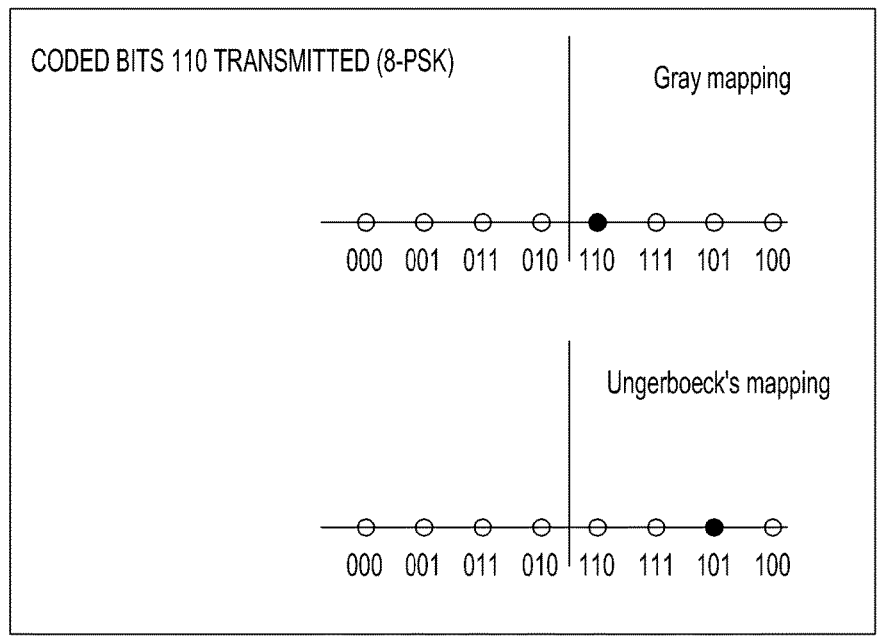
FIG. 20 is a view comparing Gray mapping with Ungerboeck's mapping in terms of modulated transmission symbols according to an embodiment of the present disclosure.

$g_3 g_2 g_1 \rightarrow a_3 a_2 a_1$ $a_3 = g_3,\ a_2 = g_3 \oplus g_2,\ a_1 = a_3 \oplus a_2 \oplus a_1$ FIG. 20 compares Gray mapping with Ungerboeck's mapping in terms of modulated transmission symbols according to an embodiment of the present disclosure.

1) In the present scheme, the transmitter may perform channel encoding in the same manner as conventional BICM.

2) The transmitter may perform modulation mapping by Ungerboeck's mapping, not by Gray mapping (a process in the case of Gray mapping will be described later). This may be realized by adding a Gray mapping-to-Ungerboeck's mapping transform operation to a conventional Gray mapping procedure.

3) The receiver performs remapping in the same manner as in conventional MLC. A signal resulting from the remapping is given as [Equation 15].

$$\bar{y}(t) = A \begin{bmatrix} \sum_{i=1}^{L} b_{2i-1}^{(1)}(t) \\ \vdots \\ \sum_{i=1}^{L} b_{2i-1}^{(M)}(t) \\ \sum_{i=1}^{L} b_{2i}^{(1)}(t) \\ \vdots \\ \sum_{i=1}^{L} b_{2i}^{(M)}(t) \end{bmatrix} + z(t)$$

[Equation 15]

where $b_i^{(j)}(t)$ is an i-th coded bit transmitted at time t through antenna j 4) The receiver may perform summed-symbol detection.

Although the receiver performs a modulo-2 operator as in MLC, the receiver performs 'summed-bits detection' instead of 'summed-codeword decoding' at each time. The LLR calculation operation is performed in the same manner as in the afore-described MLC. In the present scheme, the modulo-2 operation and LLR calculation of the receiver may be expressed as the following equation.

[Equation 16]

$$\bar{y}(t) \bmod 2 = \left( A \begin{bmatrix} b_1^{(1)}(t) \\ \vdots \\ b_1^{(M)}(t) \\ b_2^{(1)}(t) \\ \vdots \\ b_2^{(M)}(t) \end{bmatrix} + \bar{z}(t) \right)$$

-continued $$\text{mod2} \xrightarrow{\text{Calculate LLRs of } [a_m]_2 x_{b0}(t)} x_{b0}(t) = \begin{bmatrix} b_1^{(1)}(t) \\ \vdots \\ b_1^{(M)}(t) \\ b_2^{(1)}(t) \\ \vdots \\ b_2^{(M)}(t) \end{bmatrix}$$

Subsequently, the receiver may estimate the LLRs of individual symbols through LLR conversion, and decode the individual symbols based on the estimated LLRs. The LLR conversion may be performed as described with reference to the example of FIG. 21.

Figure 21:
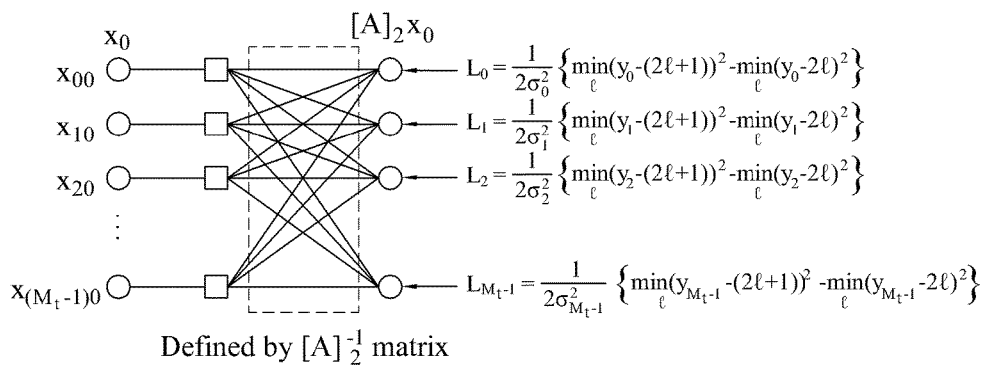
FIG. 21 is a view illustrating an exemplary LLR conversion operation of a receiver, in the case where IF is applied to bit-interleaved coded modulation (BICM)

FIG. 21 is a view illustrating an exemplary LLR conversion operation at a receiver, when IF is applied to BICM.

5) The receiver may perform symbol-level SIC using the LLRs of the individual symbols.

After the receiver makes a hard decision and then performs symbol-level SIC, using LLR information about a symbol $X_{b0}(t)$ at time t, the receiver detects a symbol $X_{b1}(t)$ (up to level L).

$$(0.5(\bar{y}(t) - A\hat{x}_{b0}(t)))\text{mod2} = \left( A \begin{bmatrix} b_3^{(1)}(t) \\ \vdots \\ b_3^{(M)}(t) \\ b_4^{(1)}(t) \\ \vdots \\ b_4^{(M)}(t) \end{bmatrix} + z(t) \right) \text{mod2}$$

6) The receiver may perform decoding using the detected symbols.

The receiver decodes each codeword based on the detected symbols $X_{b0}(1) \ldots X_{bL}(1) \, X_{b0}(2) \ldots X_{bL}(2) \ldots X_{b0}(n) \ldots X_{bL}(n)$. Since $(b_1^{(i)}(1)b_2^{(i)}(1) \ldots b_{2L}^{(i)}(1)b_1^{(i)}(2)b_2^{(i)}(2) \ldots b_{2L}^{(i)}(2) \ldots b_1^{(i)}(n)b_2^{(i)}(n) \ldots b_{2L}^{(i)}(n))$ is a codeword, the decoding is possible.

It may be noted that IF is applicable even to BICM-based coding through the above-described operations 1) to 6).

In addition, a transmission scheme in the case where the transmitter uses Gray labeling for transmission will be described. Even without Ungerboeck's labeling, the LLR of each codeword bit may be obtained by post-processing in the receiver. As described before, when Gray mapping is applied, modulated symbols and codeword bits are placed in the following relationship.

$$a_3 a_2 a_1 \rightarrow 4a_3 + 2(a_3 \oplus a_2) + a_3 \oplus a_2 \oplus a_1 \text{ (after remapping)} \quad \text{[Equation 17]}$$

It is assumed that the relationship between modulated symbols and codeword bits, described in [Equation 17] is established after remapping.

Based on the above relationship, $$c_3 = a_3$$
$$c_2 = a_3 \oplus a_2$$
$$c_1 = a_3 \oplus a_2 \oplus a_1$$

are defined, and the LLRs of $c_3, c_2, c_1$ are calculated in the afore-described operation. Thereafter, the LLRs of original code bits $a_3, a_2, a_1$, may be obtained through LLR conversion by the following equation.

$$a_3 = c_3 \quad A_{conversion} = \begin{bmatrix} 1 & 0 & 0 \\ 1 & 1 & 0 \\ 0 & 1 & 1 \end{bmatrix}_2 \quad \text{[Equation 18]}$$
$$a_2 = c_3 \oplus c_2$$
$$a_1 = c_2 \oplus c_1$$

If the transmitter uses Gray mapping, a post-processor for IF may be added to the receiver.

As a third method for expanding BPSK to QAM, a method for implementing IF based on a non-binary linear code will be described below.

While an LDPC code is taken as an example of the non-binary linear code for the convenience of description, other non-binary linear codes such as a non-binary turbo code are also applicable to the present disclosure. In the proposed method, a q value of the non-binary LDPC code may be increased according to a modulation order (for example, a non-binary LDPC code with a Galois field (GF) of $2^4$ (q=$2^4$) in 16QAM), or the non-binary LDPC code and MLC may be appropriately combined. In 16QAM, for example, MLC level 2 and a non-binary LDPC code with a GF of $2^2$ (q=$2^2$) may be used in combination.

To avoid redundancy in description, only characteristics inherent to a non-binary LDPC code will be focused below. It is assumed that Ungerboeck's labeling is used for modulation mapping. Needless to say, if Gray mapping is used, the same thing may be achieved by the afore-described post-processing and LLR conversion at the receiver in the present scheme.

In the present scheme, the transmitter performs independent encoding on an antenna basis by matching a code order q to an intended modulation order for transmission. Further, the transmitter uses Ungerboeck's labeling for modulation mapping.

The reason for transmitting a signal in this manner at the transmitter is to utilize the property that a non-binary $2^n$ code is closed to linear operation in GF($2^n$) (that is, the modulo-sum of linear codes is another code). If a modulation order and a non-binary code order are matched, each modulation symbol is a symbol of a codeword. Therefore, if the receiver performs remapping on a received signal, the receiver may directly decode a summed codeword based on the linear code property (that is, the sum of codewords is another codeword). Therefore, IF may be realized by use of the non-linear LDPC scheme according to the present disclosure.

Figure 22:
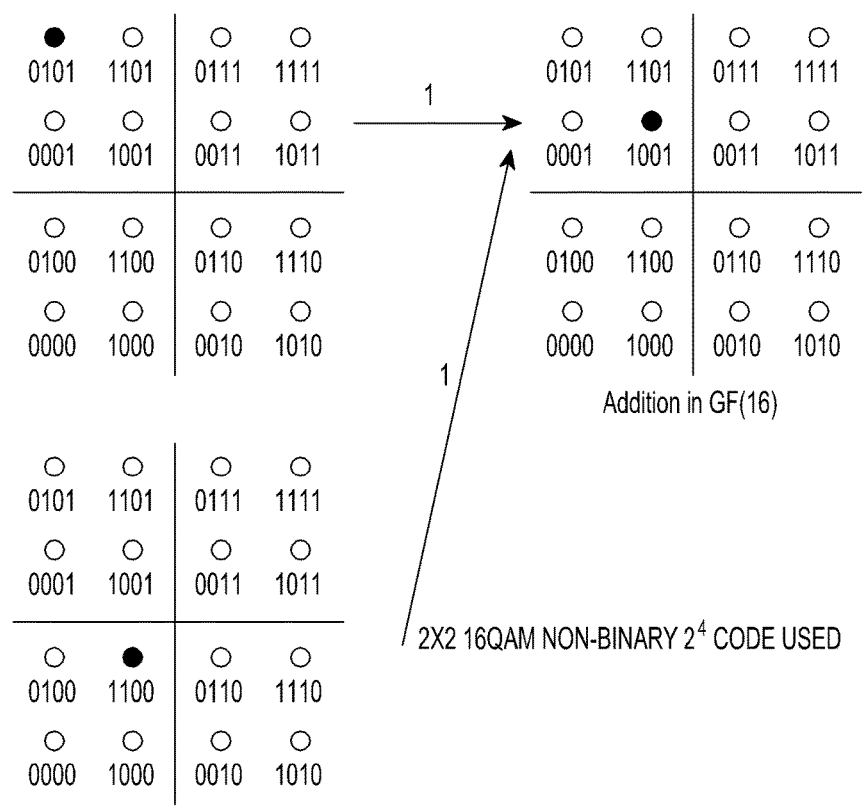
FIG. 22 is a view illustrating an exemplary procedure in which a summed codeword becomes a codeword, when a non-binary code with a code order of 16 is used in 2×2 16QAM with a modulation order of 16.

FIG. 22 illustrates a process in which a summed codeword (also) becomes a codeword in the case of a non-binary code with a code order of 16 (=$2^4$) in 2×2 16QAM with a modulation order of 16.

In addition, a method for implementing IF by using a non-binary code and MLC in combination will be described.

In the method, if the order of the non-binary code increases, the decoding complexity of the receiver may rapidly increase. The increased decoding complexity may be a big problem to transmission in high-order modulation such as 256QAM. Therefore, to solve the problem in real implementation, a technique for decreasing the code order of a non-binary LDPC code by adding a low-complexity non-binary decoder or combining the non-binary LDPC code with MLC may be considered.

Figure 23:
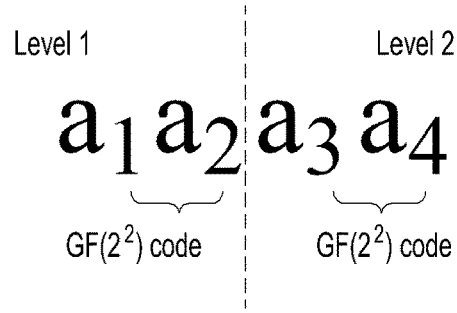
FIG. 23 describes implementing level 2 MLC-IF by using a $2^2$ LDPC code in 16QAM according to an embodiment of the present disclosure.

FIG. 23 describes implementing level 2 MLC-IF by using a $2^2$ LDPC code in 16QAM according to an embodiment of the present disclosure.

The afore-described non-binary code may increase decoding complexity along with an increase in the code order of a non-binary LDPC code. The decoding complexity may be mitigated by combining a non-binary LDCP code with MLC and thus reducing the code order of the non-binary LDPC code. Specifically, in $2^L$ modulation, IF may be realized by combining a $2^n$ non-binary LDPC code with (L−n)-level MLC (n<L). In 16QAM, for example, IF may be realized using a level 2 MLC and a non-binary LDPC code with a GF of $2^2$, as illustrated in FIG. 23. Each of MLC and non-binary coding operations may be performed as described before.

Figure 24:
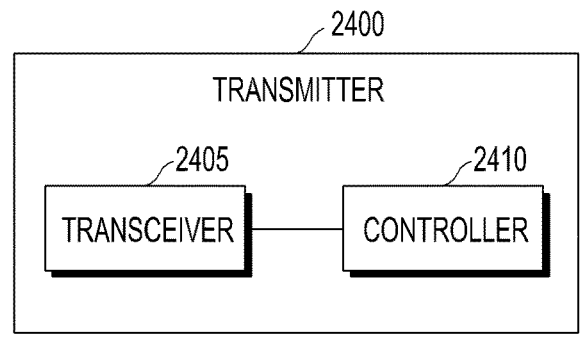
FIG. 24 is a block diagram illustrating the structure of a transmitter according to an embodiment of the present disclosure.

FIG. 24 is a block diagram of a transmitter according to an embodiment of the present disclosure.

Referring to FIG. 24, a transmitter 2400 may be any device that transmits information bits by encoding the information bits in a wireless communication system. For example, the transmitter may be a BS or a UE.

The transmitter 2400 may include a transceiver 2405 for transmitting and receiving signals to and from a receiver, and a controller 2410 for providing overall control to the transmitter 2400. It may be understood that all of the afore-described operations of a transmitter according to the present disclosure are performed under the control of the controller 2410. However, the controller 2410 and the transceiver 2405 are not always to be configured separately. Rather, the controller 2410 and the transceiver 2405 may be configured into a single unit in the form of a single chip.

Figure 25:
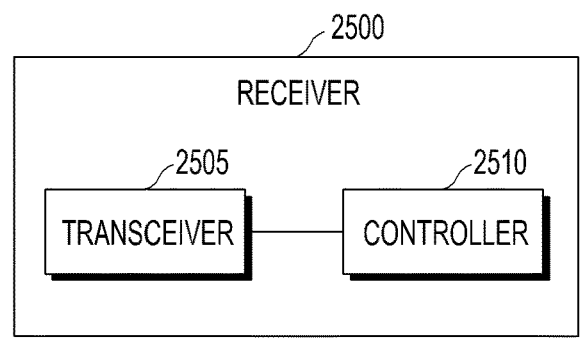
FIG. 25 is a block diagram illustrating the structure of a receiver according to an embodiment of the present disclosure.

FIG. 25 is a block diagram of a receiver according to an embodiment of the present disclosure.

Referring to FIG. 25, a receiver 2500 may be any device that receives information bits by decoding the information bits in a wireless communication system. For example, the receiver may be a UE or a BS.

The receiver 2500 may include a transceiver 2505 for transmitting and receiving signals to and from a transmitter, and a controller 2510 for providing overall control to the receiver 2500. It may be understood that all of the afore-described operations of a receiver according to the present disclosure are performed under the control of the controller 2510. However, the controller 2510 and the transceiver 2505 are not always to be configured separately. Rather, the controller 2510 and the transceiver 2505 may be configured into a single unit in the form of a single chip.

The system configuration diagrams, exemplary views of encoding and decoding methods, device diagrams, and so on illustrated in FIGS. 1 to 25 are not intended to limit the scope of the present disclosure. That is, all components or steps illustrated in FIGS. 1 to 25 should not be interpreted as essential to implementation of the present disclosure. Rather, even when only a part of the components are included, the present disclosure may be implemented without departing from the scope of the present disclosure.

The afore-described operations may be performed by providing a memory storing a related program code in any component of a transmitter or a receiver in a communication system. That is, a controller of the transmitter or the receiver may perform the operations by reading the program code from the memory and executing the program code by a processor or a central processing unit (CPU).

Various components and modules of the transmitter or the receiver as described in the present disclosure may operate in a hardware circuit such as a combination of a complementary metal oxide semiconductor (CMOS)-based logic circuit, firmware, and/or hardware, and firmware and/or software inserted into a machine-readable medium. For example, various electric structures and methods may be implemented using electric circuits such as transistors, logic gates, or application specific integrated circuits (ASICs).

As is apparent from the foregoing description, according to the present disclosure, a linear detection operation is possible even for multiple antennas and a high modulation order.

A receiver using an IF scheme according to the present disclosure outperforms a conventional linear receiver, for example, an MMSE receiver or an MMSE-SIC receiver.

A MIMO transmitter and a MIMO receiver to which a code modulation scheme according to the present disclosure is applied have excellent MIMO detection performance, compared to an MMSE-SIC receiver as well as a conventional linear receiver.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for receiving a signal by integer forcing in a wireless communication system, the method comprising:
   receiving a signal through a plurality of antennas;
   filtering the received signal using a forcing matrix;
   generating codewords by remapping the filtered received signal;
   acquiring a summed codeword by performing a modulo operation on the codewords;
   decoding the summed codeword; and
   acquiring original codewords by performing an inversion operation on the decoded summed codeword.

2. The method according to claim 1, wherein:
   the received signal is modulated in binary phase shift keying (BPSK) and transmitted,
   the forcing matrix is determined using an integer matrix, and
   decoding the summed codeword comprises:
      calculating a log likelihood ratio (LLR) of the summed codeword based on an expanded constellation determined by the integer matrix; and
      decoding the summed codeword using the calculated LLR.

3. The method according to claim 2, wherein acquiring the original codewords by performing the inversion operation on the decoded summed codeword comprises:
   estimating LLRs of individual codewords using the calculated LLR of the summed codeword; and
   acquiring the original codewords for the individual codewords using the estimated LLRs of the individual codewords.

4. The method according to claim 1, wherein the received signal is modulated in a quadrature amplitude modulation (QAM) scheme and transmitted.

5. The method according to claim 4, wherein the received signal is a signal multi-level-encoded using a linear code and transmitted, the method further comprising:
   eliminating the original codewords from the generated codewords; and
   acquiring new original codewords from codewords from which the original codewords were eliminated.

6. The method according to claim 4, wherein:
the received signal is encoded using a non-binary code and transmitted, and
a modulation order of the QAM scheme is equal to a code order of the non-binary code.

7. The method according to claim 4, wherein:
the received signal is multi-level-encoded using a non-binary code and transmitted, and
a code order of the non-binary code is determined by a modulation order of the QAM scheme and a level value of the multi-level-encoding.

8. A method for transmitting information bits in a wireless communication system, the method comprising:
dividing information bits according to a plurality of levels;
determining a code rate of each of the plurality of levels based on a target spectral efficiency rate;
determining a plurality of sets of the information bits based on the determined code rate;
independently encoding the plurality of sets of the information bits;
modulation-mapping the encoded information bits; and
transmitting the modulation-mapped information bits through a plurality of antennas.

9. The method according to claim 8, wherein the code rate for each of the plurality of levels is equally applied to the plurality of antennas.

10. The method according to claim 8, wherein the code rate for each of the plurality of levels is determined based on forcing matrix used for filtering a signal.

11. An apparatus for receiving a signal by integer forcing in a wireless communication system, the apparatus comprising:
a transceiver configured to receive a signal through a plurality of antennas; and
a controller configured to:
filter the received signal using a forcing matrix,
generate codewords by remapping the filtered received signal,
acquire a summed codeword by performing a modulo operation on the codewords,
decode the summed codeword, and
acquire original codewords by performing an inversion operation on the decoded summed codeword.

12. The apparatus according to claim 11, wherein:
the received signal is modulated in binary phase shift keying (BPSK) and transmitted,
the forcing matrix is determined using an integer matrix, and
the controller is configured to:
calculate a log likelihood ratio (LLR) of the summed codeword based on an expanded constellation determined by the integer matrix, and
decode the summed codeword using the calculated LLR.

13. The apparatus according to claim 12, wherein the controller is configured to:
estimate LLRs of individual codewords using the calculated LLR of the summed codeword, and
acquire the original codewords for the individual codewords using the estimated LLRs of the individual codewords.

14. The apparatus according to claim 11, wherein the received signal is modulated in a quadrature amplitude modulation (QAM) scheme and transmitted.

15. The apparatus according to claim 14, wherein:
the received signal is a signal multi-level-encoded using a linear code and transmitted, and
the controller is configured to:
eliminate the original codewords from the generated codewords, and
acquire new original codewords from codewords from which the original codewords were eliminated.

16. The apparatus according to claim 14, wherein:
the received signal is encoded using a non-binary code and transmitted, and
a modulation order of the QAM scheme is equal to a code order of the non-binary code.

17. The apparatus according to claim 14, wherein:
the received signal is multi-level-encoded using a non-binary code and transmitted, and
a code order of the non-binary code is determined by a modulation order of the QAM scheme and a level value of the multi-level-encoding.

18. An apparatus for transmitting information bits in a wireless communication system, the apparatus comprising:
a controller configured to:
divide information bits according to a plurality of levels;
determine a plurality of sets of the information bits;
determine a code rate of each of the plurality of levels based on a target spectral efficiency rate;
independently encode the plurality of sets of the information bits; and
modulation-map the encoded information bits; and
a transceiver operably connected to the controller, the transceiver configured to transmit the modulation-mapped information bits through a plurality of antennas.

19. The apparatus according to claim 18, wherein the code rate for each of the plurality of levels is equally applied to the plurality of antennas.

20. The apparatus according to claim 18, wherein the code rate for each of the plurality of levels is determined based on forcing matrix used for filtering a signal.

21. The method according to claim 8, wherein the code rate of the each of the plurality of levels is determined depending on a knowledge of a channel size.

22. The apparatus according to claim 18, wherein the controller determines the code rate of the each of the plurality of levels depending on a knowledge of a channel size.

* * * * *